United States Patent
Klaghofer et al.

(10) Patent No.: US 10,079,914 B2
(45) Date of Patent: Sep. 18, 2018

(54) METHOD FOR THE SECURE AND DYNAMIC RELOADING OF ADDITIONAL SOFTWARE FROM A WEBRTC SERVER TO A WEBRTC CLIENT

(71) Applicant: Unify GmbH & Co. KG, Munich (DE)

(72) Inventors: Karl Klaghofer, Munich (DE); Viktor Ransmayr, Munich (DE)

(73) Assignee: Unify GmbH & Co. KG, Munich (DE)

( * ) Notice: Subject to any disclaimer, the term of this patent is extended or adjusted under 35 U.S.C. 154(b) by 218 days.

(21) Appl. No.: 15/034,722

(22) PCT Filed: Nov. 3, 2014

(86) PCT No.: PCT/EP2014/002940
§ 371 (c)(1),
(2) Date: May 5, 2016

(87) PCT Pub. No.: WO2015/067358
PCT Pub. Date: May 14, 2015

(65) Prior Publication Data
US 2016/0286006 A1 Sep. 29, 2016

(30) Foreign Application Priority Data

Nov. 6, 2013 (DE) .................. 10 2013 018 624

(51) Int. Cl.
*G06F 15/16* (2006.01)
*H04L 29/06* (2006.01)
*G06F 8/65* (2018.01)

(52) U.S. Cl.
CPC .............. *H04L 67/42* (2013.01); *G06F 8/65* (2013.01); *H04L 65/1069* (2013.01); *H04L 65/60* (2013.01)

(58) Field of Classification Search
USPC .................. 709/203; 713/310; 715/753; 375/240.02; 379/265.09
See application file for complete search history.

(56) References Cited

U.S. PATENT DOCUMENTS

| 2006/0041431 A1 | 2/2006 | Maes |
| 2009/0154556 A1* | 6/2009 | Kim .................. H04L 65/1083 375/240.02 |
| 2010/0306074 A1 | 12/2010 | Channabasavaiah et al. |
| 2013/0332857 A1* | 12/2013 | Kim ...................... H04L 65/403 715/753 |
| 2014/0126715 A1* | 5/2014 | Lum .................. H04M 3/5133 379/265.09 |

(Continued)

FOREIGN PATENT DOCUMENTS

EP 0911728 A1 4/1999

OTHER PUBLICATIONS

"WebRTC Data Channel Protocol", RTCWeb Working Group, Feb. 26, 2013, R. Mozilla, S. Ericsson, M. Tuexen.

(Continued)

*Primary Examiner* — Quang N Nguyen
(74) *Attorney, Agent, or Firm* — Buchanan Ingersoll & Rooney PC

(57) ABSTRACT

A computer arrangement and a computer-implemented method for the secure and dynamic reloading of additional software from a WebRTC server to a WebRTC can include use of a WebRTC data channel to transfer the software.

20 Claims, 1 Drawing Sheet

(56) References Cited

U.S. PATENT DOCUMENTS

| | | | | |
|---|---|---|---|---|
| 2014/0173304 A1* | 6/2014 | Rahman | ............. | H04L 12/6418 |
| | | | | 713/310 |
| 2014/0222894 A1* | 8/2014 | Gangadharan | .......... | H04L 67/02 |
| | | | | 709/203 |
| 2014/0223452 A1* | 8/2014 | Santhanam | ............. | G06F 9/541 |
| | | | | 719/328 |
| 2015/0029296 A1* | 1/2015 | Ni | ......................... | H04N 7/148 |
| | | | | 348/14.01 |

OTHER PUBLICATIONS

Written Opinion of the International Searching Authority for PCT/EP2014/002940 dated Jan. 26, 2015 (Form PCT/ISA/237). (German Translation).
International Search Report for PCT/EP2014/002940 dated Jan. 26, 2015 (Form PCT/ISA/210). (German Translation).
International Preliminary Report on Patentability for PCT/EP2014/002940 dated May 10, 2016 (Form PCT/ISA/237). (English Translation).

* cited by examiner

METHOD FOR THE SECURE AND DYNAMIC RELOADING OF ADDITIONAL SOFTWARE FROM A WEBRTC SERVER TO A WEBRTC CLIENT

CROSS-REFERENCE TO RELATED APPLICATIONS

This application is the United States National Stage under 35 U.S.C. § 371 of PCT International Patent Application No. PCT/EP2014/002940, filed on Nov. 3, 2014, and claiming priority to German application no. 10 2013 018 624.2, filed on Nov. 6, 2013.

BACKGROUND OF THE INVENTION

Field of the Invention

Embodiments relate to computer-implemented methods for secure and dynamic downloading of add-on software from a WebRTC server to a WebRTC client, as well as corresponding computer systems.

Background of the Related Art

WebRTC browser manufacturers like Google or Mozilla generally deliver their browsers with certain codecs. These codecs include, for example, audio codecs such as G.711 and OPUS, as well as video codecs, of which VP8 is an example. Such codecs are an integral component of these WebRTC-compatible browsers.

However, it is not readily possible for manufacturers of WebRTC applications to safely and reliably integrate add-on codecs into their projects that were not included in the original browser version, for the purpose of generating added value for their customers. Part of the problem is that such add-on codecs are often protected by industrial property rights and can therefore be acquired and installed only through payment of a corresponding license fee.

Such add-on codecs are generally installed by downloading them in so-called browser plug-ins and then installing them. However, this poses the following disadvantages with WebRTC browsers:

- The charter for WebRTC with IETF/W3C states that WebRTC should operate without plug-ins. This means that the codecs involved should be integrated inherently into the browser, i.e., should already be built in by the browser's manufacturer.
- The specific problem facing browser manufacturers in fulfilling this requirement is that codecs for which industrial property rights (abbreviated as IPR) exist, and which therefore have licensing fees, cannot be provided along with manufacturers' free browsers.
- Browser plug-ins represent a security risk, because the source of the add-on codecs installed in them cannot be securely controlled, which also makes them an additional obstacle to the acceptance of WebRTC application solutions for many customers.

The previously described problem with the secure installation of add-on codecs, using the example of audio and video codecs, is also fairly common in other add-on software that is to be installed in a WebRTC client such as a browser—especially a WebRTC browser.

BRIEF SUMMARY OF THE INVENTION

Embodiments of the invention may, but are not required, to eliminate one or more of the above-described disadvantages and provide a method for secure and dynamic downloading of add-on software from a WebRTC server to a WebRTC client, as well as a corresponding computer system.

Embodiments may include methods, computer systems, computer programs, computer program products, and machine-readable data carriers including such computer programs.

A computer-implemented method for secure and dynamic downloading of add-on software from a WebRTC server to a WebRTC client according to an embodiment of the invention may involve the following steps: In the course of establishing the WebRTC connection between the WebRTC client and the WebRTC server, the required software is transferred using a WebRTC data channel. This makes it possible to securely and dynamically download and install the required add-on software without having to resort to a browser plug-in. The channel used is commonly called a WebRTC data channel. This WebRTC data channel itself is standardized through IETF/W3C and provides a secure transfer based on IP/UDP/DTLS/SCTP.

LIST OF REFERENCE INDICATORS

Figure 1:
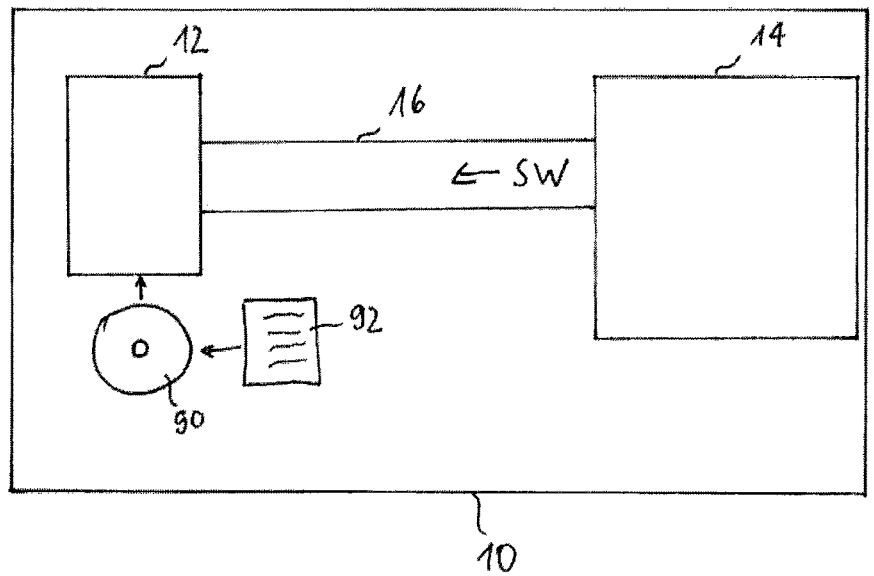
FIG. 1 shows a schematic overview of one embodiment of a computer system according to an embodiment of the invention.

10=Computer system
12=First computer
14=Second computer/WebRTC server
16=Network
90=Data carrier
92=Computer program
SW=Software

DETAILED DESCRIPTION OF THE INVENTION

As noted above, a computer-implemented method for secure and dynamic downloading of add-on software from a WebRTC server to a WebRTC client according to the invention involves the following steps: In the course of establishing the WebRTC connection between the WebRTC client and the WebRTC server, the required software is transferred using a WebRTC data channel. This makes it possible to securely and dynamically download and install the required add-on software without having to resort to a browser plug-in. The channel used is commonly called a WebRTC data channel. This WebRTC data channel itself is standardized through IETF/W3C and provides a secure transfer based on IP/UDP/DTLS/SCTP.

According to one advantageous embodiment of the invented method, the software is intended for a real-time application. In particular, this software is a codec such as an audio or video codec, for example.

It can be advantageous if the WebRTC data channel is kept open and not immediately cut off after the transfer, so as to allow for rapid downloading of additional necessary add-on software, for example, without a time delay.

It can also be advantageous to transfer the software automatically between the WebRTC client and the WebRTC server as soon as the WebRTC connection is established, so that a user does not have to be concerned with handling this aspect himself. For the example of a telephone call or conference call, this can mean that an audio codec is downloaded automatically as soon as the telephone call or conference call begins. Alternatively, however, the download of a codec can also be triggered specifically by a user. Providing an install field (install button) would be advantageous in that case. An example of a payment model in this respect would be the so-called "pay as you use" concept.

Additional advantages can be derived if the software is only temporarily loaded into the WebRTC client and remains usable only for a predetermined length of time. In the case of the previously mentioned example, this means that a downloaded add-on codec is only available for use during a telephone call or conference call, and can be used only until the WebRTC client (in particular a WebRTC browser) is restarted. This also supports the "pay as you use" payment model. Of course, the downloaded add-on codec can alternatively also be permanently installed and usable, such that it is still available to the user after a restart of the WebRTC client or the WebRTC browser.

The invented method is advantageously implemented as a computer program or computer program product and can be stored on a machine-readable data carrier. For this reason, these two options are also considered to be part of the present invention.

A computer system according to an embodiment of the invention contains a first computer, on which a WebRTC client is running that is suitable for executing the previously described method for secure and dynamic downloading of add-on software from a WebRTC server to a WebRTC client. The computer system according to the invention further includes a second computer serving as the WebRTC server and through which the software to be transferred is stored or is made accessible in such a way that it can be called up by or transferred to a WebRTC client upon request. These two computers should be connected by a corresponding network, which must be configured such that it can provide a WebRTC data channel (together with the WebRTC connection between the RTC client and the WebRTC server). Obviously, the same advantages as those described with respect to the invented method can be achieved with a computer system according to the invention.

Additional advantages, features, and characteristics of the present invention are presented in the following description of advantageous embodiments with reference to the drawing.

In one embodiment a computer system 10 again includes a first computer 12, a second computer 14 being used as a WebRTC server, and a network 16 that connects the first computer 12 and the second computer 14 and is configured in such a way that WebRTC connections—to which WebRTC data channels belong—can be established. As soon as this is accomplished, the software SW can be transferred from a server 14 to the client on the first computer 12, which is represented symbolically by a corresponding arrow.

On the first computer 12, a CD-ROM 90 is shown schematically as the example of a data carrier on which a computer program or computer program product 92 can be stored, which again is shown schematically as a sheet with program code. After the computer program 90 is installed on the first computer 12, a WebRTC client running on this computer 12 can be further developed according to the invention so that it can execute the invented method. In the explanation of the invented method, it is assumed in the following that the WebRTC client is a WebRTC browser (hereinafter shortened to "browser"), which desires to download an audio codec from the WebRTC server (hereinafter shortened to "server") 14 for a telephone call (shortened to "call"), because the standard audio codec integrated into the browser (such as G.711 or OPUS) is considered inadequate. Such an audio codec with expanded function scope is based on an H.264 or H.265, for example.

For the application of the present invention, downloads of speech codecs such as G.729 are obviously also possible.

According to the following example, in his installed or accessed browser, the user is given the option, on his user interface (e.g., in the menu item "settings"), of downloading add-on codecs. Alternatively, this can be done automatically, for example when the WebRTC client or browser is installed, when a telephone call is initiated, etc.

Figure 2:
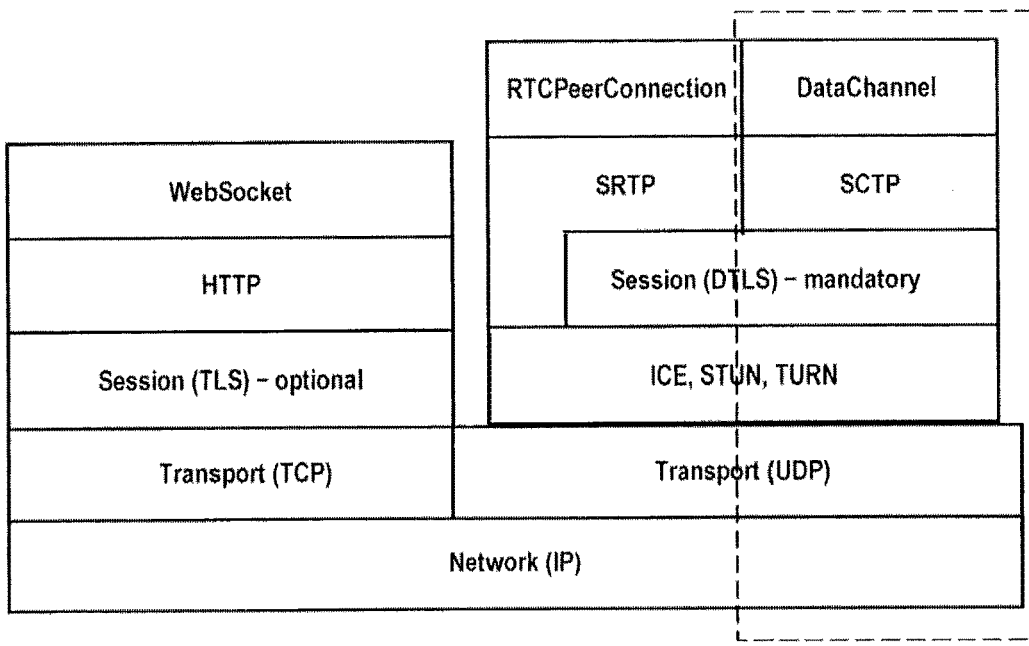
FIG. 2 shows a schematic representation of how the invented method is executed based on the standardized WebRTC protocol stack.

According to an embodiment of the invention, first a signal for establishing the connection and setting up the corresponding browser capabilities is generated. This is shown in the left column of FIG. 2. Because the designations and abbreviations used here are known in and of themselves, a detailed description is not provided. This left column and the column shown to the right of it are parts of a so-called WebRTC protocol stack. After the signal, a WebRTC user data connection is established from a browser to a predefined server address, for which WebRTC session signaling is used here. The WebRTC data channel is generated and the characteristics of that data channel are negotiated between the browser and the server application via SDP (Session Description Protocol) Offer/Answer method, for example. For the standard WebRTC, an SCTP (Stream Control Transmission Protocol) channel is used, which is secured by the DTLS (Datagram Transport Layer Security), representing an encryption protocol. Through this secure data channel, negotiated dynamically between the browser and the server, the codec file is transferred securely to the browser.

On the browser's side, the codec is installed through the browser API (Application Programming Interface). The browser API used for this can be specific to the browser's manufacturer or can also be standardized. This establishment of the WebRTC data channel and its use for transferring the codec represents the basis for the invented method and is represented in the right column of FIG. 2 as a box made of dashed lines. It can be seen from the dashed-line box that the data channel is using SCTP, which is again secured by DTLS. These protocols are part of the standard WebRTC, so they do not need any further description or explanation. The actual communication using the downloaded add-on software or codec then takes place through the left part of the right column in FIG. 2, specifically through the RTC peer connection and SRTP (Secure Real-Time Transport Protocol), which is the "actual" carrier channel for transferring the data, in particular media data such as audio and/or video data that are transferred through an individual WebRTC connection.

After the successful download and local installation of this add-on codec, the data connection between the terminal or browser and the server can be terminated. Alternatively, the WebRTC data channel can also be kept active, for more rapid downloading of additional add-on codecs or other software, for example. From this point on, for WebRTC audio applications and/or WebRTC video applications such as telephone calls or conference calls, the browser can use both codecs that are already integrated into the browser and not subject to industrial property rights (e.g., G.711, OPUS, VP8) and the above-described downloaded add-on codecs (which the browser manufacturer could not integrate into the browser when it was created because they are subject to industrial property rights and corresponding licensing fees).

Depending upon the application, it is possible for the codec download to take place automatically when a call is made or a conference call is initiated. However, it is also possible for the codec download to be initiated and carried out at the user's express request.

If the downloaded add-on codec is permanently installed, it remains available even after the browser is restarted. This type of use, for example, can incur relatively high license fees for the codec involved. It can therefore be advantageous for the downloaded add-on codec to be loaded only temporarily (i.e., held in the RAM) and for its use to be available only during a call or during a conference call, or for it to be usable only until the browser is restarted. Another fee model is possible for this, such as one in which only concrete use must be paid for. This can represent a significant advantage for customers who do not use codecs often.

In summary, according to the invention, it is possible to expand a WebRTC client, such as a browser, using downloaded add-on software (e.g., a codec) with which the WebRTC client can be configured. Using the invented method, this downloaded add-on software is not only obtained from a secure source—i.e., the WebRTC server—but also transferred over a secure route in the form of a WebRTC data channel. This allows for extremely secure expansion of WebRTC client functionality. Because this expansion is available at all times and can also be modified, the expansion is also very dynamic.

The present invention can also be used with other applications such as instant messaging or e-mail traffic.

It should be noted that the features of the invention described by referencing the presented embodiments, for example the type and configuration of individual components of the computer system or the sequence of individual steps in the method, can also be present in other embodiments, unless stated otherwise or prohibited for technical reasons.

We claim:

1. A computer-implemented method for secure and dynamic downloading of add-on software from a Web Real-Time Communication ("WebRTC") server to a WebRTC client, comprising:
a first computer device having a browser signaling to establish a connection and set up corresponding browser capabilities, the first computer device comprising non-transitory memory and a processor, the browser being a WebRTC client;
establishing a user WebRTC data connection via a network, the user WebRTC data connection being a communicative connection between the browser and a second computer device that functions as a WebRTC server, the establishing of the user WebRTC data connection comprising:
negotiating characteristics of a user WebRTC data channel of the user WebRTC data connection between the browser and the second computer device via the network;
after the user WebRTC data connection is established via the network, the first computer device receiving at least one file for the browser from the second computer device via the user WebRTC data channel;
the browser installing the at least one file received via the user WebRTC data channel via an Application Programming Interface ("API") of the browser to expand a functionality of the browser; and
wherein the establishing of the user WebRTC data connection via the network is performed automatically in response to a call being initiated such that the first computer device receives the at least one file for the browser from the second computer device via the user WebRTC data channel and the at least one file received via the user WebRTC data channel is installed via the API of the browser to expand the functionality of the browser in response to the call being initiated.

2. The method of claim 1, wherein the at least one file is software for a real-time application.

3. The method of claim 1, wherein the at least one file comprises codec software that defines at least one add-on feature for the browser.

4. The method of claim 3, wherein the at least one file is an audio codec.

5. The method of claim 3, wherein the at least one file is a video codec.

6. The method of claim 1, wherein the user WebRTC data channel is kept open after the at least one file is transferred.

7. The method of claim 1, wherein the at least one file is transferred automatically between the browser and the second computer device as soon as the user WebRTC data connection is established.

8. The method of claim 1, comprising:
restarting the browser after the at least one file is installed such that the browser uninstalls the at least one file to remove the expanded functionality of the browser provided by the at least one file.

9. The method of claim 1, wherein the browser installing the at least one file received via the user WebRTC data channel via the API of the browser to expand the functionality of the browser is performed such that the expanded functionality of the browser is removed when the browser is restarted after the at least one file is installed.

10. The method of claim 1, wherein the browser installing the at least one file received via the user WebRTC data channel via the API of the browser to expand the functionality of the browser is performed such that the expanded functionality is only retained at the browser for a pre-selected period of time.

11. The method of claim 10, comprising:
after the pre-selected period of time has expired, removing the at least one file so that the expanded functionality defined by the at least one file is removed from the browser.

12. The method of claim 1, wherein the establishing of the user WebRTC data connection via the network is performed automatically in response to the call being initiated is performed automatically in response to the call being initiated via the first computer device.

13. The method of claim 12, wherein the call is a conference call.

14. The method of claim 1, wherein the browser installing the at least one file received via the user WebRTC data channel via the API of the browser to expand the functionality of the browser is performed such that the expanded functionality of the browser is only maintained during the call and the expanded functionality of the browser is removed after the call.

15. The method of claim 1, wherein the browser installing the at least one file received via the user WebRTC data channel via the API of the browser to expand the functionality of the browser is performed such that the expanded functionality of the browser is maintained during the call.

16. A non-transitory machine-readable medium having a program stored thereon that defines a method that is executable by a first communication device such that the first communication device performs the method when the program is executed, the method comprising:

the first computer device signaling to establish a connection and set up corresponding browser capabilities, the first computer device having a browser, the browser being a WebRTC client;

the first computer device signaling establishing a user WebRTC data connection via a network, the user WebRTC data connection being a communicative connection between the browser and a second computer device that functions as a WebRTC server, the establishing of the user WebRTC data connection comprising:

negotiating characteristics of a user WebRTC data channel of the user WebRTC data connection between the browser and the second computer device via the network;

after the user WebRTC data connection is established via the network, the first computer device receiving at least one file for the browser from the second computer device via the user WebRTC data channel;

the browser installing the at least one file received via the user WebRTC data channel via an Application Programming Interface ("API") of the browser to expand a functionality of the browser; and wherein the establishing of the user WebRTC data connection via the network is performed automatically in response to a call being initiated such that the first computer device receives the at least one file for the browser from the second computer device via the user WebRTC data channel and the at least one file received via the user WebRTC data channel is installed via the API of the browser to expand the functionality of the browser in response to the call being initiated.

17. A computer system comprising:

a first computer device comprising non-transitory memory and a processor that is communicatively connectable to a second computer device via a network, the second computer device having a processor and non-transitory memory;

the first computer device having a browser configured to initiate signaling to establish a connection and set up corresponding browser capabilities, the browser being a WebRTC client;

the second computer device configured to establish a user WebRTC data connection via the network, the user WebRTC data connection being a communicative connection between the browser and the second computer device, the user WebRTC data connection being establishable such that characteristics of a user WebRTC data channel of the user WebRTC data connection are negotiatable between the browser and the second computer device via the network;

the first computer device configured to receive at least one file for the browser from the second computer device via the user WebRTC data channel such that the at least one file is installable at the browser via an Application Programming Interface ("API") of the browser to expand a functionality of the browser; and wherein the first computer device is configured such that establishment of the user WebRTC data connection via the network is performed automatically in response to a call being initiated such that the first computer device receives the at least one file for the browser from the second computer device via the user WebRTC data channel and the at least one the received via the user WebRTC data channel is installed via the API of the browser to expand the functionality of the browser in response to the call being initiated.

18. The computer system of claim 17, wherein establishment of the user WebRTC data connection via the network that is performed automatically in response to the call being initiated is in response to the call being initiated via the first computer device.

19. The computer system of claim 17, wherein the at least one file is installable at the browser via the API such that the expanded functionality of the browser is only maintained during the call and the expanded functionality of the browser is removed after the call.

20. The computer system of claim of claim 17, wherein the at least one file is installable at the browser via the API such that the expanded functionality of the browser is removed when the browser is restarted after the at least one file is installed.

* * * * *